(12) United States Patent
Mizushima et al.

(10) Patent No.: US 7,742,374 B2
(45) Date of Patent: Jun. 22, 2010

(54) METHOD OF RECORDING DATA ON OPTICAL RECORDING MEDIA AND OPTICAL RECORDING DEVICE

(75) Inventors: Tetsuro Mizushima, Moriguchi (JP); Tatsuya Kato, Chuo-ku (JP); Hiroshi Shingai, Chuo-ku (JP); Hideaki Miura, Chuo-ku (JP); Jiro Yoshinari, Chuo-ku (JP)

(73) Assignee: TDK Corporation, Tokyo (JP)

( * ) Notice: Subject to any disclaimer, the term of this patent is extended or adjusted under 35 U.S.C. 154(b) by 930 days.

(21) Appl. No.: 11/167,291

(22) Filed: Jun. 28, 2005

(65) Prior Publication Data
US 2005/0286383 A1    Dec. 29, 2005

(30) Foreign Application Priority Data
Jun. 28, 2004   (JP) ............................ 2004-189938

(51) Int. Cl.
*G11B 7/00* (2006.01)
(52) U.S. Cl. ................. 369/59.11; 369/59.12; 369/116; 369/47.5
(58) Field of Classification Search .............. 369/59.11, 369/59.12, 116, 47.5
See application file for complete search history.

(56) References Cited

U.S. PATENT DOCUMENTS 5,802,032 A * 9/1998 Jacobs et al. ............. 369/59.11
6,636,477 B1 * 10/2003 Miyamoto et al. ........... 369/286
6,751,513 B1    6/2004 Spruit
7,130,256 B2 * 10/2006 Toda et al. ................ 369/59.11
7,489,614 B2 *  2/2009 Shoji et al. ................ 369/59.12
2001/0017833 A1   8/2001 Yamada et al.
2001/0053115 A1 * 12/2001 Nobukuni et al. ......... 369/59.12
2003/0081523 A1 *  5/2003 Miyagawa et al. ........ 369/59.11
2003/0227850 A1 * 12/2003 Kato et al. ................ 369/59.11
2004/0130994 A1 *  7/2004 Hellmig et al. ........... 369/59.11
2004/0170115 A1 *  9/2004 Inoue et al. ............... 369/275.4
2005/0083819 A1    4/2005 Kato et al.

FOREIGN PATENT DOCUMENTS

| JP | A 2003-203337 | 7/2003 |
| JP | A 2003-208713 | 7/2003 |
| WO | WO 03/063145 A1 | 7/2003 |

* cited by examiner

*Primary Examiner*—Wayne R Young
*Assistant Examiner*—Linh T Nguyen
(74) *Attorney, Agent, or Firm*—Oliff & Berridge, PLC

(57) ABSTRACT

A method of recording data on a double-layer optical recording medium having a recording layer with high light transmittance is provided. A laser beam is modulated to emit a pulse series of laser including a write pulse of a write power and a cooling pulse of a bottom power, so as to encode and write data to be recorded as recording marks of a length nT along a track of the recording layer, where n is an integer and T is one clock cycle. An nT recording mark is formed using (n−1) write pulse(s), and when forming a recording mark of 4 T or longer, a cooling pulse with a pulse width of 0.8 T to 2 T is inserted before the last write pulse. Recording marks are thereby accurately formed without heat interference between consecutive recording marks and cross erase between recording marks of adjacent tracks.

5 Claims, 6 Drawing Sheets

METHOD OF RECORDING DATA ON OPTICAL RECORDING MEDIA AND OPTICAL RECORDING DEVICE

BACKGROUND OF THE INVENTION

1. Field of the Invention

The present invention relates to an optical recording medium having a semi-transparent recording layer, and a method and a device for recording data on the optical recording medium.

2. Description of the Related Art

There are known double-layer phase-change optical recording media having two phase-change recording layers L0 (rear side layer) and L1 (front side layer).

Optical recording media such as DVD (Digital Versatile Disc) use a modulation scheme to encode data to be recorded into recording marks along each track of the recording layer. The length of recording marks is nT, where n is an integer and T is one clock cycle. CD-RW (Compact Disc Rewritable), for example, uses the Eight-to-Fourteen Modulation (EFM) scheme to encode data to be recorded into recording marks with lengths ranging from 3 T to 11 T.

Rewritable optical recording media such as CD-RW and the like generally have a phase-change layer as a recording layer. A laser beam is modulated in accordance with the data to be recorded and the obtained laser beam pulses are irradiated onto the recording layer to form recording marks with various lengths nT. The recording marks in the phase-change layer are in the amorphous state and the spaces between the marks are in the crystalline state.

The amorphous recording marks are formed by melting the crystalline part with laser beams and quenching it quickly, while the crystalline state is obtained by irradiating laser beams thereon at above the crystallization temperature of the phase-change layer for more than a set period of time.

The pulse series of the laser beam to obtain the amorphous state includes write pulses of a write power and pulses of a bias (almost bottom) power, and the pulse series to obtain the crystalline state includes pulses of an erase power level.

To write an nT recording mark in a CD-RW, (n−1) write pulses are emitted. For example, four write pulses (5−1=4 pulses) are emitted to write a 5 T recording mark.

To control the mark length, for example, to increase the mark length by 1 T, e.g., from 5 T to 6 T, a pulse series of 1 T period consisting of a write pulse and a bias level pulse is added. The width Tw of the added write pulse is 0.2 T or more, taking account of the rise time and the fall time of the pulse. This means that the interval between write pulses is (1−Tw)T and less than 0.8 T. If the rise time and the fall time are reduced, Tw becomes less than 0.2 T, while (1−Tw)T is less than 1 T but infinitely close to 1 T.

With conventional recording strategies, the trailing edges of recording marks tend to be indistinct because of heat accumulated in the recording layer before the last write pulse. This is more evident in recording layers that are slow cooling structure because of thin metal heat-sink layers (to be described later). Conventionally, a cooling pulse was added after the last write pulse and before the laser power was returned to the erase power level to adjust the position of the trailing edge of the recording mark. This approach is effective only to the limited extent with slow cooling structured recording layers and cannot solve the problem that various margins are lost.

Meanwhile, with the increase in data storage density, multilayer optical recording media have been developed. The recording layer on the light incident side of such optical discs needs to be semi-transparent in order to enable recording and reproducing to and from the recording layer below. Accordingly, in optical recording media having phase-change recording layers the above-mentioned metal heat-sink layer which was conventionally about 100 nm thick needs to be reduced to, for example, less than 30 nm, so as to make the recording layer on the light incident side semi-transparent. The recording layer on the light incident side is thus slow cooling structure because of the reduced heat-sink effect.

This slow cooling structure brought about the problem of heat interference between consecutive recording marks and between adjacent tracks (so-called as cross erase), because the marks that were transformed into the amorphous state by rapid cooling are not cooled sufficiently quickly.

As the heat interference between recording marks and cross erase between tracks were problems to be solved not only for the multilayer optical recording media but also for single layer recording media, various solutions have been proposed as shown in Japanese Patent Laid-Open Publications Nos. 2003-203337 and 2003-208713.

Japanese Patent Laid-Open Publication No. 2003-203337 shows a method of adjusting the level of erase power in accordance with the space length of the region to be erased. Japanese Patent Laid-Open Publication No. 2003-208713 shows a method wherein the write pulse power is switched between two levels.

However, these methods require adjustment of laser pulse at an increased number of power levels, making the laser modulation process complicated.

A 2 T strategy could be applied in which the pulse is synchronized with a 2 T clock so as to increase the cooling pulse before the last write pulse. In this case, however, the control of the mark length and width would be difficult, as the same number of write pulses are used to write marks with different lengths, e.g., m write pulses for both 2mT mark and (2m+1)T mark. Moreover, the pulse width needs to be increased to write long marks as the number of write pulses is small (e.g., three, for forming a 7 T mark). The large pulse width causes a wider area to be molten when recording, making the cross erase phenomenon more distinct, particularly in slow cooling structured recording layers.

SUMMARY OF THE INVENTION

In view of the foregoing problems, various exemplary embodiments of this invention provide a method and a device for recording data in an optical recording medium, with which heat interference between consecutive recording marks and cross erase between adjacent tracks are prevented, and which are particularly suitable for optical recording media having a semi-transparent recording layer with a thin metal heat-sink layer, and a recording medium on which data is recorded using these method and device.

Through research, the inventor of the present invention has discovered that, when recording marks with a length of 4 T or more using write pulses, heat interference between consecutive recording marks and cross erase between adjacent tracks can be suppressed by inserting a cooling pulse with a pulse width of 1 T to 2 T before the last write pulse.

That is, the present invention described below allows the aforementioned objects to be achieved.

(1) A method of recording data on an optical recording medium, including the step of: modulating a laser beam to emit a pulse series of laser including a write pulse of a write power and a cooling pulse of an approximately bottom power and irradiating the laser beam onto a recording layer of the optical recording medium so as to encode and write data to be recorded as recording marks of a length nT along a track of the recording layer, where n is an integer and T is one clock cycle, wherein an nT recording mark is formed using (n−1) write pulse(s), and when forming a recording mark of 4 T or longer, a cooling pulse with a pulse width of 0.8 T to 2 T is inserted before a write pulse that is at the end of the pulse series.

(2) The method of recording data on an optical recording medium according to (1), wherein: the recording layer has a light transmittance of 30% to 80% at a recording wavelength; and the laser beam is irradiated onto the recording layer through a light transmitting layer covering the recording layer.

(3) The method of recording data on an optical recording medium according to (1), wherein the optical recording medium has a stack of a first recording layer, a transparent intermediate layer, the recording layer that serves as a second recording layer, and a light transmitting layer, these layers being laminated in this order on a substrate.

(4) The method of recording data on an optical recording medium according to any one of (1) to (3), wherein: the recording layer includes a phase-change recording layer and a metal heat-sink layer of a thickness t of $0<t<30$ nm; and the laser beam is irradiated onto the phase-change recording layer from an opposite side of the metal heat-sink layer.

(5) A device for recording data on an optical recording medium having a recording layer and a light transmitting layer covering the recording layer, wherein a pulse-modulated laser beam is irradiated onto the recording layer through the light transmitting layer so as to encode and write data to be recorded as recording marks of a length nT along a track of the recording layer, where n is an integer and T is one clock cycle, the device comprising, at least: an optical device for emitting a laser beam onto the optical recording medium; and a laser drive device for supplying laser drive signals to modulate the laser beam to emit a pulse series of laser including a write pulse of a write power and a cooling pulse of an approximately bottom power, wherein an nT recording mark is formed using (n−1) write pulse(s), and when forming a recording mark of 4 T or longer, a cooling pulse with a pulse width of 0.8 T to 2 T is inserted before a write pulse that is at the end of the pulse series.

(6) The data recording device according to (5), wherein the recording layer has a light transmittance of 30% to 80% at a recording wavelength.

(7) The data recording device according to (5) or (6), wherein: the recording layer includes a phase-change recording layer and a metal heat-sink layer of a thickness t of $0<t<30$ nm; and the laser beam is irradiated onto the phase-change recording layer from an opposite side of the metal heat-sink layer.

According to the present invention, heat interference between consecutive recording marks and cross erase between adjacent tracks can be prevented when recording marks in an optical recording medium. The effect of preventing heat interference between recording marks and cross erase between adjacent tracks is particularly evident in a semi-transparent recording layer with a thin metal heat-sink layer.

DETAILED DESCRIPTION OF THE PREFERRED EMBODIMENT

Figure 1:
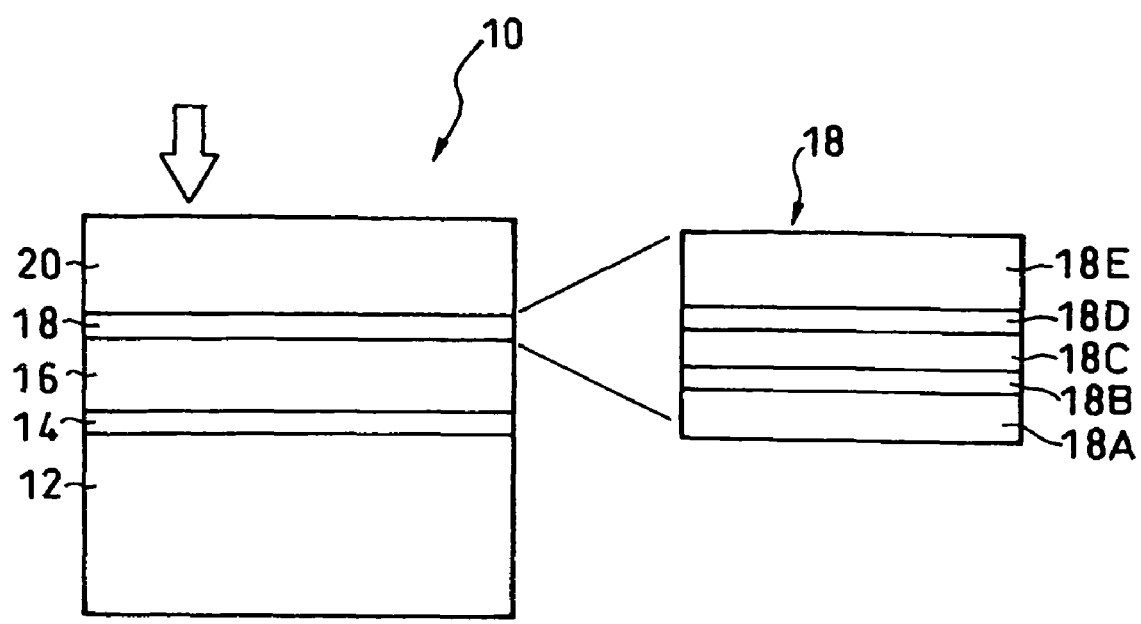
FIG. 1 is a schematic cross-sectional view showing an optical recording medium according to one embodiment of the present invention.

In various exemplary embodiments of the method of recording data on an optical recording medium, the optical recording medium has a first recording layer, a transparent intermediate layer, and a second recording layer stacked in this order, the second recording layer including a phase-change recording layer and a metal heat-sink layer of a thickness t of $0<t<30$ nm. A recording laser beam is irradiated onto the phase-change recording layer from an opposite side of the metal heat-sink layer. The laser beam is modulated to emit a pulse series of laser including a write pulse of a write power and a cooling pulse of a bottom power and then is irradiated onto the optical recoding medium. Data to be recorded is encoded and formed as recording marks of a length nT along a track of the second recording layer, where n is an integer and T is one clock cycle. An nT recording mark is formed using (n−1) write pulse(s), and when forming a recording mark of 4 T or longer, a cooling pulse with a pulse width of 0.8 T to 2 T is inserted before the last write pulse.

First Exemplary Embodiment

A first exemplary embodiment of the present invention will be hereinafter described in detail with reference to FIG. 1 and FIG. 2.

An optical recording medium 10 according to the first exemplary embodiment includes a first recording layer or L0 layer 14, a transparent intermediate layer 16, a second recording layer or L1 layer (hereinafter "recording layer") 18, and a light transmitting layer 20 laminated on a substrate 12 in this order.

The recording layer 18 includes, as shown in enlargement in FIG. 1, an underlayer 18A on the transparent intermediate layer 16, a metal heat-sink layer 18B, a second protection layer 18C, a phase-change recording layer 18D, and a first protection layer 18E, laminated upon one another in this order.

The metal heat-sink layer 18B is provided for heat-sink and light interference and is made preferably of an Ag alloy. The layer thickness t is $0<t<30$ nm so that the layer is semi-transparent. Because of this thickness range, the recording layer 18 has an overall light transmittance of 30% to 80% at a recording wavelength. The layer thickness t should be, more preferably, 0<t<20 nm.

If the light transmittance of the recording layer 18 is less than 30%, recording to the first recording layer 14 will be difficult, whereas, if the light transmittance exceeds 80%, recording to the recording layer 18 will be difficult. If the thickness t exceeds 30 nm, the light transmittance will be too low.

The underlayer 18A, and the first and second protection layers 18E and 18C are each formed of a stack of various dielectric layers.

The phase-change recording layer 18D is made of a material that can transform from an amorphous phase to a crystalline phase and vice versa, such as SbTe-based eutectic alloy or the like, and has a thickness of, preferably, 10 nm or less so that it is semi-transparent.

Figure 2:
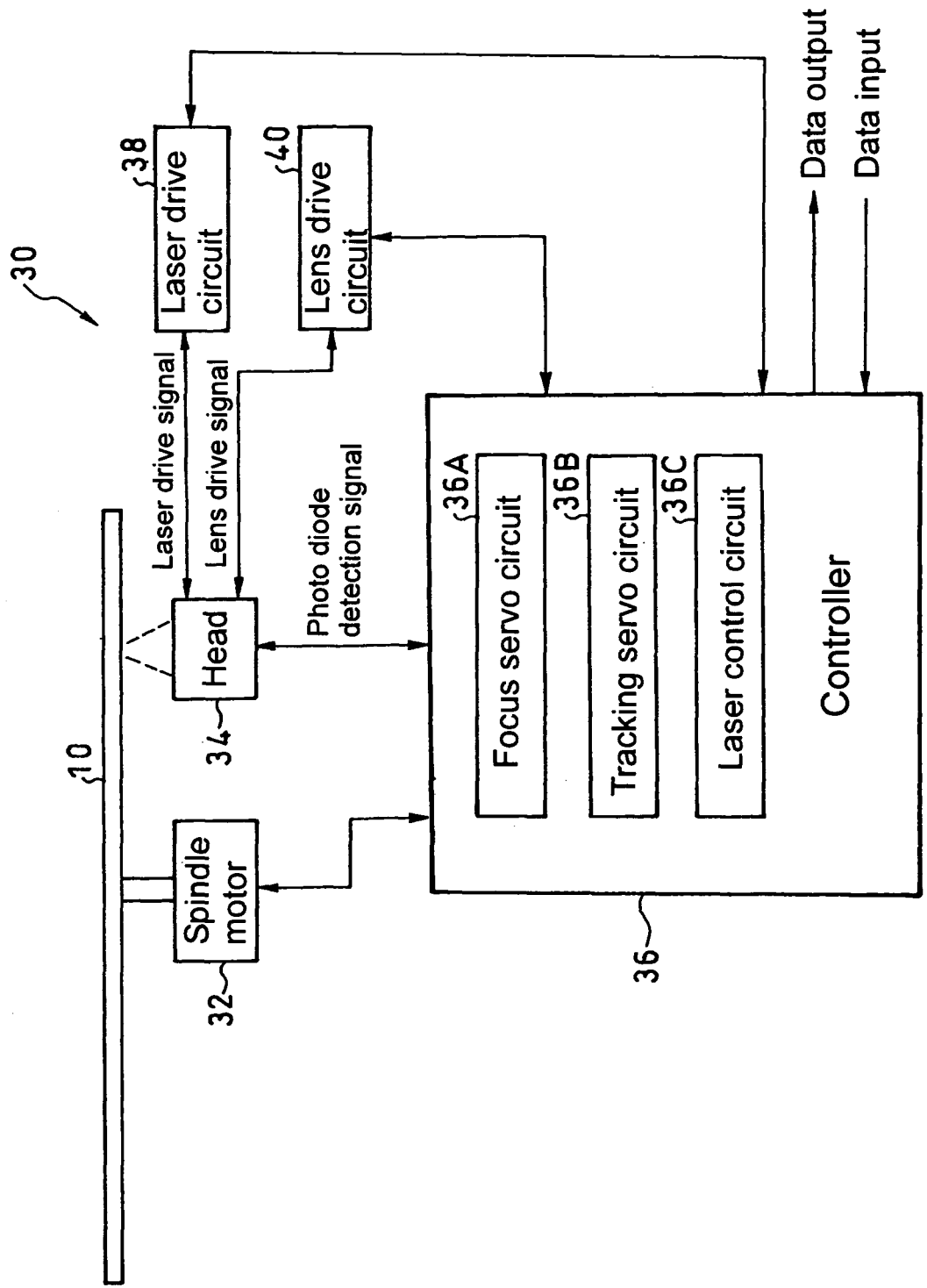
FIG. 2 is a block diagram showing one embodiment of a data recording/reproducing device according to one embodiment of the present invention.

Data is recorded or reproduced to or from the optical recording medium 10 having the above structure with a data recording/reproducing device 30 shown in FIG. 2.

The data recording/reproducing device 30 includes a spindle motor 32 for rotating the optical recording medium 10, a laser projector head 34 for directing a laser beam onto the optical recording medium 10, a controller 36 for controlling the head 34 and the spindle motor 32, a laser drive circuit 38 for supplying laser drive signals to modulate the laser beam from the head 34 into pulse series, and a lens drive circuit 40 for supplying lens drive signals to the head 34.

The controller 36 includes a focus servo circuit 36A, a tracking servo circuit 36B, and a laser control circuit 36C.

The laser control circuit 36C generates the laser drive signals supplied from the laser drive circuit 38. When recording data, it generates laser drive signals appropriately based on recording condition setting data stored on the optical recording medium. When reproducing data, it generates the laser drive signals such that a laser beam of a predetermined power is emitted in accordance with the type of the optical recording medium. Such predetermined power level when reproducing data is defined by reproducing condition setting data.

The recording condition setting data refers to information used for specifying various parameters necessary for recording data on the optical recording medium 10. In this first exemplary embodiment, the recording condition setting data includes at least the power level of the laser beam for recording, and information necessary for determining the recording strategy that is described later in detail.

The recording condition setting data includes not only specific parameters necessary for the data recording but also those that specify a recording condition by designating one of various parameters previously stored in the data recording/reproducing device.

In the first exemplary embodiment, the recording condition setting data includes laser power levels for the recording: Write power (recording power) Pw for melting the phase-change recording layer to transform it into the amorphous state, bottom power (bias power) Pb for cooling the recording layer, and erase power Pe for transforming the phase-change recording layer into the crystalline state. The power levels have a relationship of Pw>Pe>Pb (see FIG. 3).

When recording data, the laser beam is modulated to emit a pulse series of a write pulse of the above various power levels, a cooling pulse, and an erase pulse, and is then irradiated onto the recording layer. The recording strategy defines the number, width, interval, power, and the like of the modulated pulse.

Figure 3:
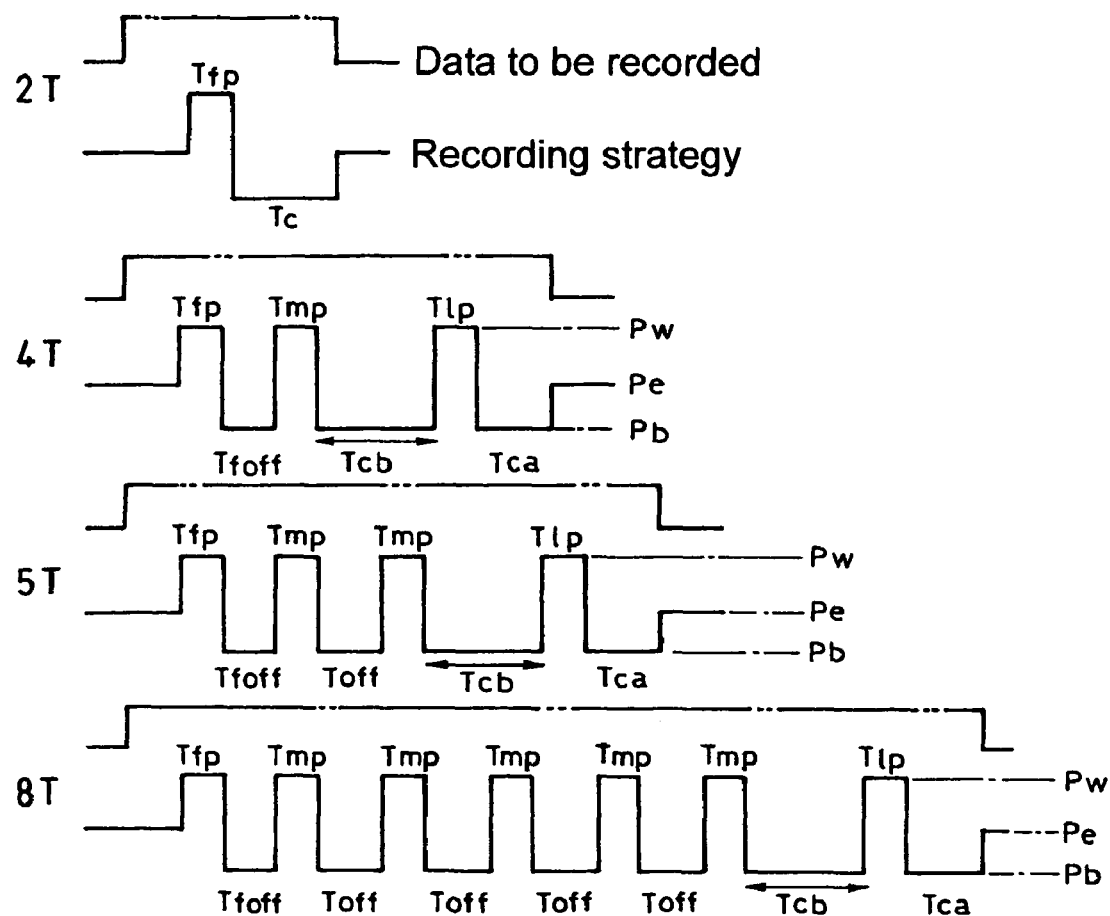
FIG. 3 is a diagram showing the recording strategy according to the same embodiment.

Generally, the top, middle, and last parts of the write pulse are called top pulse Tfp, multi-pulse Tmp, and last pulse Tlp, as shown in FIG. 3. These Tfp, Tmp, and Tlp and Tfoff, Toff, Tc, Tcb, and Tca to be described later each indicate the pulse width or time, but they are described as being pulses for ease of description. Data to be recorded is encoded into recording marks with different lengths along each track of the recording layer. The length of recording marks is nT, where n is an integer and T is one clock cycle.

FIG. 3 shows the recording strategy of the first exemplary embodiment in a (1,7) RLL modulation system. FIG. 3 shows the data to be recorded (upper side) and the recording strategy (lower side) of a 2 T recording mark, 4 T recording mark, 5 T recording mark, and 8 T recording mark.

According to this recording strategy, an nT recording mark is formed using (n−1) write pulse(s) (a top pulse Tfp, one or more multi-pulses Tmps, and a last pulse Tlp). For forming a recording mark of 4 T or longer, a cooling pulse Tcb with a pulse width of 0.8 T to 2 T is inserted before the last write pulse (or last pulse Tlp) (see FIG. 3). A 2 T recording mark is formed with one top pulse Tfp and one cooling pulse Tc thereafter.

The cooling pulse Tcb inserted for forming a recording mark of 4 T or longer should have a width of 0.8 T or more so as to achieve the cooling effect of the molten phase-change layer. If the width exceeds 2 T, the recording mark will be too long. To ensure the cooling effect, the width of the cooling pulse Tcb should be 1 T or more, not exceeding 2 T.

The width of the cooling pulse Tcb is about twice larger than the interval Toff or Tfoff between other two write pulses, whereby the phase-change layer can be cooled sufficiently rapidly before the last write pulse, making the trailing edge of the mark clear.

With conventional recording strategies, the trailing edge of marks tended to be indistinct because of heat accumulated in the recording layer before the last write pulse. Various margins can be lost because of indistinct edges of marks particularly in slow cooling structured recording layers. Further, with the conventional 2 T strategy mentioned in the foregoing, the increased pulse width causes a larger area to be molten when recording, leading to a larger cross erase region.

In the first exemplary embodiment, the last write pulse is delayed by inserting a long cooling pulse before the last write pulse so as to cool the phase-change recording layer, whereby the trailing edge of the recording mark formed by the last pulse can be made clear.

With this method, the width of the molten area is not increased too much as with a wide write pulse according to a conventional 2 T strategy, and therefore the cross erase phenomenon, which can readily occur in slow cooling structured recording layers, is suppressed. Further, because of the clear trailing edge of the recording marks, heat interference between adjacent recording marks is suppressed.

EXAMPLE 1

Double-layer optical recording media similarly structured as the medium 10 of FIG. 1 were produced, and the recording/reproducing characteristics of their recording layers (L1 layers) were evaluated.

The followings are the attributes of the double-layer optical recording media:

Substrate thickness: 1.1 mm; Thickness of transparent intermediate layer: 25 µm; Thickness of light transmitting layer 75 µm; Material and thickness of phase-change recording layer in L1 layer: Sb eutectic alloy, 6 nm; Material and thickness of metal heat-sink layer: Ag alloy, 10 nm; Material of the 1st protection layer, 2nd protection layer, and underlayer: Laminated dielectric layers of AlN, ZnS—$SiO_2$, and $ZrO_2$; Thickness of 1st protection layer: 60 nm; Thickness of 2nd protection layer: 5 nm; Thickness of underlayer: 5 nm.

After making the L1 layer (phase-change recording layer) in the crystalline state using an initializing device (initialization), random signals were recorded with the following conditions to write recording marks with a length of 2 T to 8 T. The recording and reproducing characteristics were then evaluated. In this structure, the light transmittance of the L1 layer was 46%.

Clock frequency: 132 MHz; Clock cycle (1 T): 7.6 nsec; recording constant line velocity (CLV): 10.5 m/s; Modulation method: (1.7) RLL; Data transfer rate: 72 Mbps; Channel bit length: 0.12 μm/bit; Numerical aperture (NA): 0.85; Laser wavelength: 405 nm.

Random signals were over recorded ten times on a specified track, and then random signals were over recorded ten times each on the two adjacent tracks on both sides of the specified track. After that, the reproducing waveform of the recording marks formed on the center track that were recorded first was equalized, and the clock jitter of the reproducing signal was measured using a time interval analyzer. Further, after over recording random signals ten times on a specified track, the clock jitter of the one track only was measured.

Figure 4:
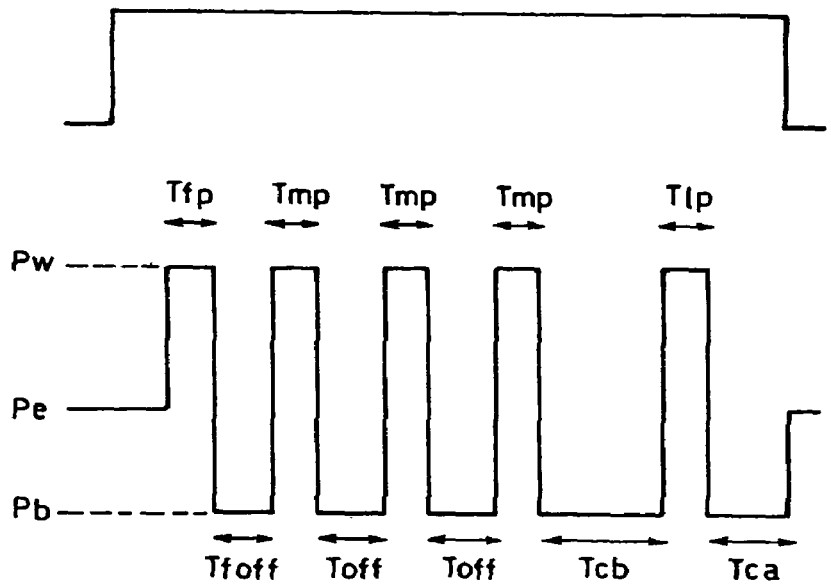
FIG. 4 is a diagram showing the recording strategy according to the example 1 of the invention.

The recording strategy in this example was as follows (see FIG. 4): Tfp=0.4 T, Tmp=0.3 T, Tlp=0.4 T, Tfoff=0.5 T, Toff=0.7 T, Tcb=1.2 T, and Tca=0.7 T.

COMPARATIVE EXAMPLE 1

As a comparative example, recording was performed to the same optical recording media using the following recording strategy with a conventional scheme:

Tfp=0.4 T, Tmp=0.3 T, Tlp=0.4 T, Tfoff=0.7 T, Toff=0.7 T, Tcb=0.7 T, and Tca=0.7 T.

COMPARATIVE EXAMPLE 2

Further, as another comparative example, recording was performed using a recording strategy that is synchronized with a 2 T clock, where m write pulses were used to write both 2mT marks and (2m+1)T marks:

For forming 2mT marks, Tfp=0.6 T, Tmp=Tlp=0.4 T, Tfoff=Toff=Tcb=1.6 T, and Tca=0.8 T.

For forming (2m+1)T marks, Tfp=0.6 T, Tmp=0.4 T, Tlp=0.7 T, Tfoff=Toff=Tcb=Tca=1.6 T.

Figure 5:
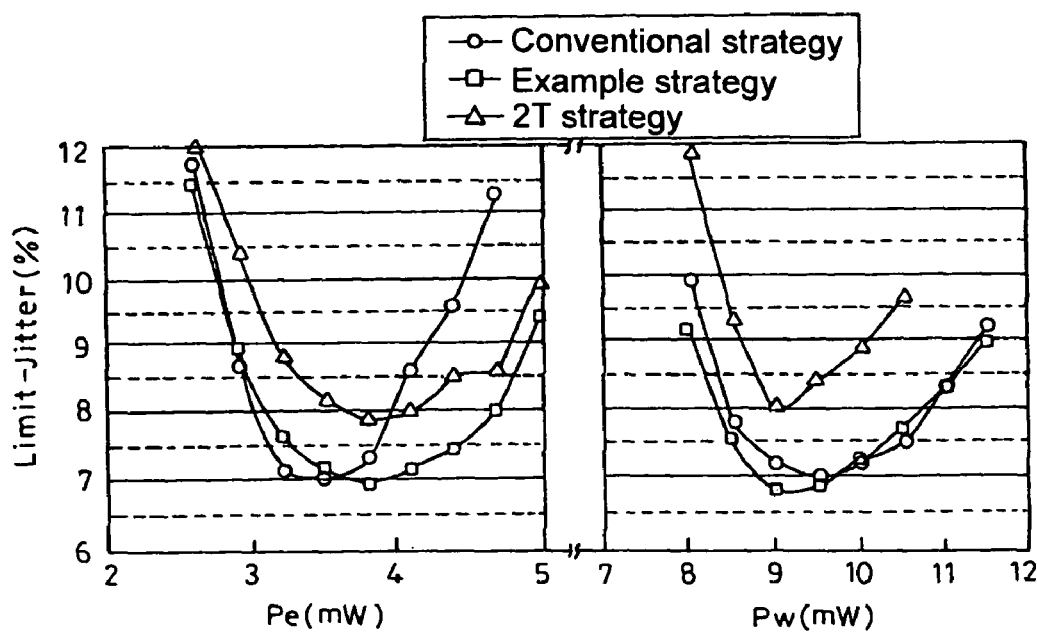
FIG. 5 is a graph showing the relationship between the erase power/write power and the jitter in reproducing of data recorded in L1 layer of the optical recording media using the recording strategy of the invention and of a conventional strategy and a 2 T strategy as comparative examples.

FIG. 5 shows the measurement results of clock jitter during reproducing from the double-layer optical recording media, on which data was recorded with various levels of erase power Pe and write power Pw, using the recording strategy of the example of the present invention and of the above comparative examples 1 and 2.

Figure 6:
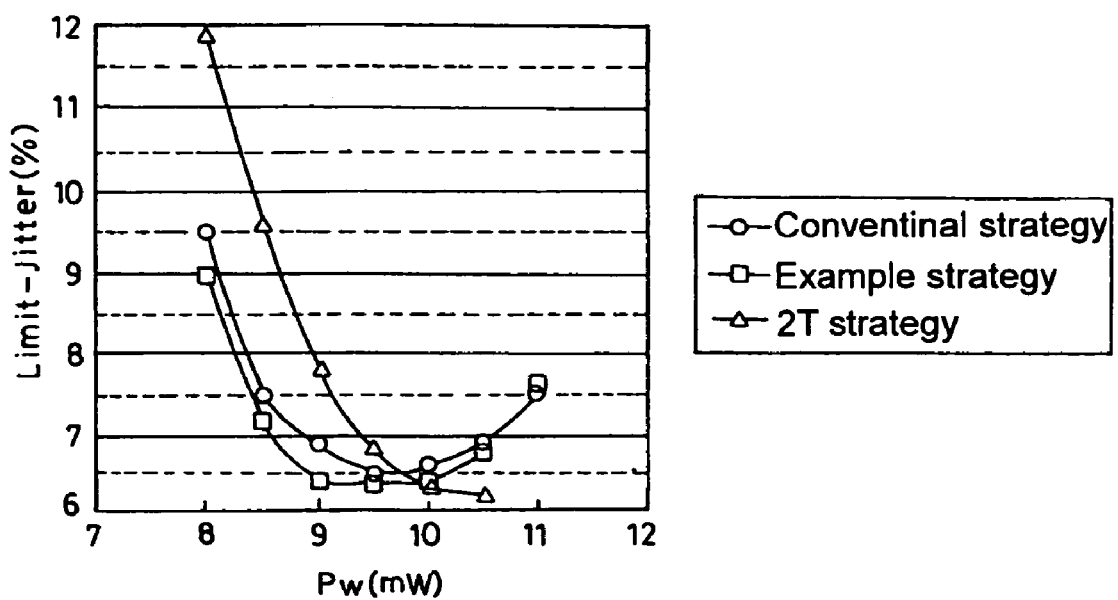
FIG. 6 is a graph showing the relationship between the write power and the jitter in reproducing of data recorded in a single-layer semi-transparent recording layer using the recording strategy of the example 1 and of the comparative examples 1 and 2.

FIG. 6 shows the clock jitter plotted versus the write power of one track only. FIG. 5 shows that, with the recording strategy of the example of the invention, the erase power margin is about twice wider than that with the conventional recording strategies, and that wide erase margins are obtained even with semi-transparent recording layers having relatively high light transmittance.

The single track measurement data shows that the 2 T strategy can be used without problems (see FIG. 6), but the graph on the right side of FIG. 5, which shows the jitter of the disc including the cross erase region, indicates that the write power margin is too small, apparently because of large cross erase in the semi-transparent recording layer. In contrast, the recording strategy of the example of the invention ensures that a wide write power margin is achieved.

EXAMPLE 2

Figure 7:
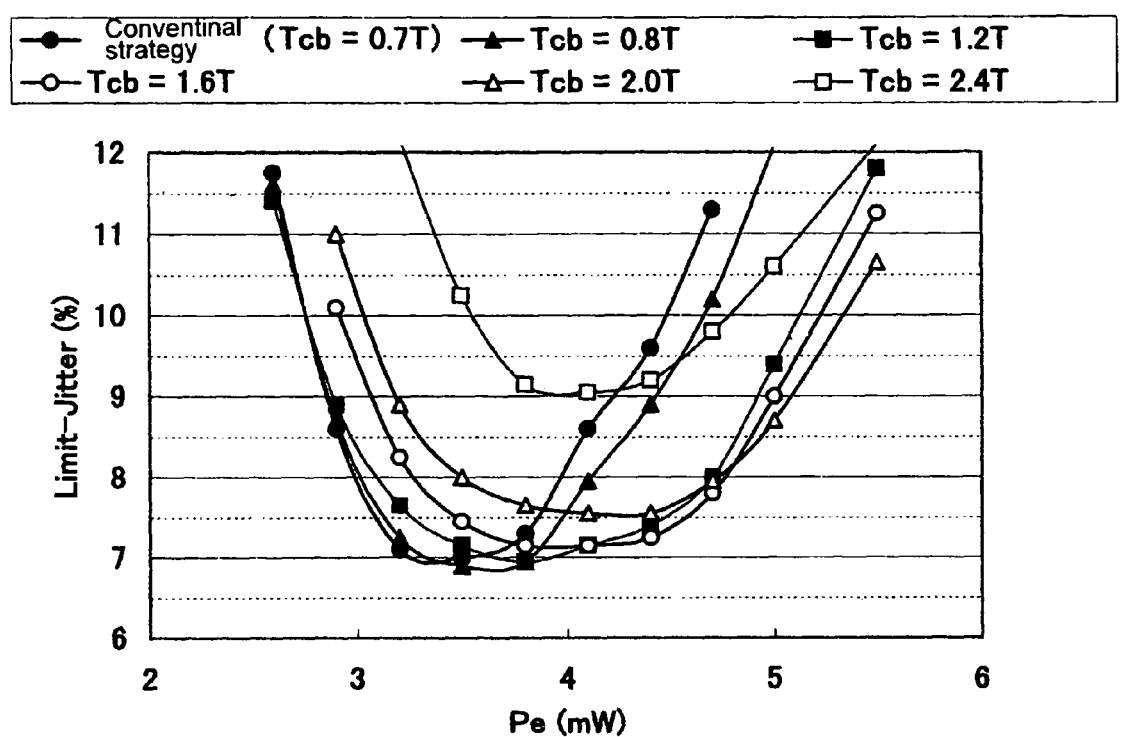
FIG. 7 is a graph showing the relationship between the jitter, Tcb, and Pe during reproducing of data in L1 layer, the data being recorded while varying the pulse width of the cooling pulse Tcb and the erase power Pe.

The clock jitter was measured during reproducing from the L1 layer of the double-layer optical recording media recorded in the same condition as in the example 1 except that the width of Tcb was varied sequentially (0.8 T, 1.2 T, 1.6 T, 2.0 T, and 2.4 T) and the erase power Pe was varied between 2.6 mW and 5.5 mW. FIG. 7 and Table 1 show the measurement results thereof.

TABLE 1

| Pe | Conventional Strategy (Tcb = 0.7T) | Tcb = 0.8T | Tcb = 1.2T | Tcb = 1.6T | Tcb = 2.0T | Tcb = 2.4T |
|---|---|---|---|---|---|---|
| 2.6 | Limit | 11.75 | 11.60 | 11.40 | | |
| 2.9 | −Jitter | 8.60 | 8.70 | 8.90 | 10.10 | 11.00 |
| 3.2 | (%) | 7.10 | 7.25 | 7.65 | 8.25 | 8.90 | 12.20 |
| 3.5 | | 7.00 | 6.90 | 7.15 | 7.45 | 8.00 | 10.25 |
| 3.8 | | 7.30 | 6.95 | 6.95 | 7.15 | 7.65 | 9.15 |
| 4.1 | | 8.60 | 7.95 | 7.15 | 7.15 | 7.55 | 9.05 |
| 4.4 | | 9.60 | 8.90 | 7.40 | 7.25 | 7.55 | 9.20 |
| 4.7 | | 11.30 | 10.20 | 8.00 | 7.80 | 7.95 | 9.80 |
| 5.0 | | | 12.05 | 9.40 | 9.00 | 8.70 | 10.60 |
| 5.5 | | | | 11.80 | 11.25 | 10.65 | 12.10 |

These results show that, when the pulse width of the cooling pulse Tcb is set between 0.8 T and 2.0 T, the clock jitter is smaller in comparison with the cases where Tcb was set to 0.7 T and 2.4 T. Namely, this means the recording mark can be formed clear.

In the above examples, when the light transmittance of the L1 layer was less than 30%, recording to the L0 layer was difficult, whereas, if the light transmittance exceeds 80%, recording to the L1 layer 18 was difficult.

What is claimed is:

1. A method of recording data on an optical recording medium, including the step of:
   modulating a laser beam to emit a pulse series of laser including a write pulse of a write power and a cooling pulse of an approximately bottom power and irradiating the laser beam onto a recording layer of the optical recording medium so as to encode and write data to be recorded as recording marks of a length nT by using (n−1) write pulse(s) along a track of the recording layer, where n is an integer and T is one clock cycle, wherein
   when forming a recording mark of 4 T or longer, a cooling pulse $T_{cb}$ with a pulse width of 0.8 T to 2 T is inserted before a write pulse that is at the end of the pulse series,
   a cooling pulse $T_{foff}$ after the first write pulse has a pulse width of 0.4 T or over to less than 1.0 T, and
   a cooling pulse $T_{off}$ between the cooling pulse $T_{foff}$ and the cooling pulse $T_{cb}$ has a pulse width of 0.4 T or over to less than 0.8 T.

2. The method of recording data on an optical recording medium according to claim 1, wherein
   the optical recording medium has a stack of a first recording layer, a transparent intermediate layer, the recording layer that serves as a second recording layer, and a light transmitting layer, these layers being laminated in this order on a substrate.

3. The method of recording data on an optical recording medium according to claim 1, wherein:
   the recording layer has a light transmission of 30% to 80% at a recording wavelength; and the laser beam is irradiated onto the recording layer through a light transmitting layer covering the recording layer.

4. A device for recording data on an optical recording medium having a recording layer and a light transmitting layer covering the recording layer, wherein a pulse-modulated laser beam is irradiated onto the recording layer through the light transmitting layer so as to encode and write data to be recorded as recording marks of a length nT by using (n−1) write pulse(s) along a track of the recording layer, where n is an integer and T is one clock cycle, the device comprising, at least:

an optical device for emitting a laser beam onto the optical recording medium; and a laser drive device for supplying laser drive signals to modulate the laser beam to emit a pulse series of laser including a write pulse of a write power and a cooling pulse of an approximately bottom power, wherein when forming a recording mark of 4 T or longer, a cooling pulse $T_{cb}$ with a pulse width of 0.8 T to 2 T is inserted before a write pulse that is at the end of the pulse series, a cooling pulse $T_{foff}$ after the first write pulse has a pulse width of 0.4 T or over to less than 1.0 T, and a cooling pulse $T_{off}$ between the cooling pulse $T_{foff}$ and the cooling pulse $T_{cb}$ has a pulse width of 0.4 T or over to less than 0.8 T.

5. The data recording device according to claim 4, wherein the recording layer has a light transmittance of 30% to 80% at a recording wavelength.

* * * * *